Jan. 28, 1958
A. I. BEAN
2,821,025
GEAR MEASURING INSTRUMENT
Filed Aug. 27, 1956
2 Sheets-Sheet 1
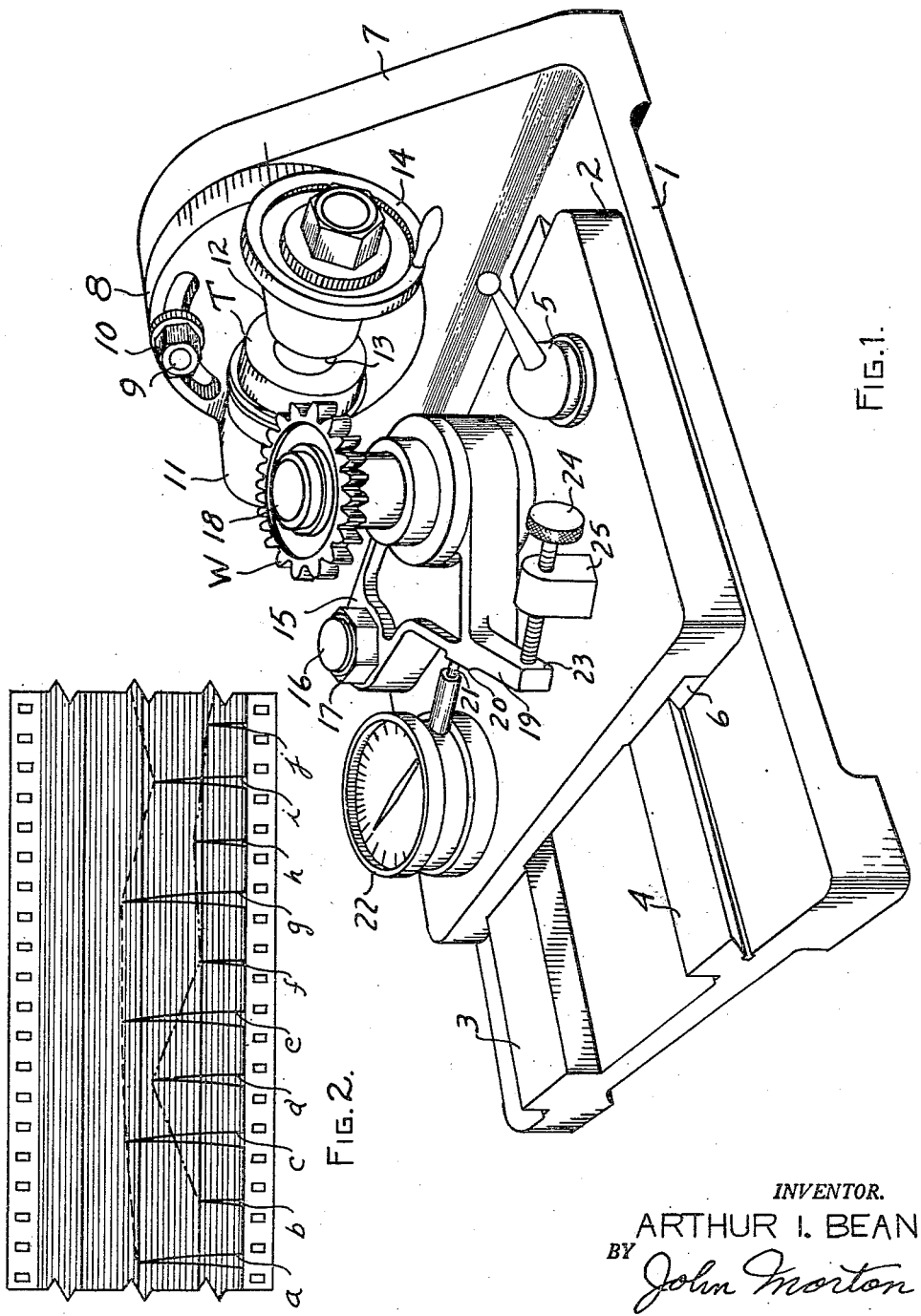
*INVENTOR.*
ARTHUR I. BEAN
BY John Morton
HIS ATTORNEY.

Jan. 28, 1958  A. I. BEAN  2,821,025
GEAR MEASURING INSTRUMENT
Filed Aug. 27, 1956
2 Sheets-Sheet 2
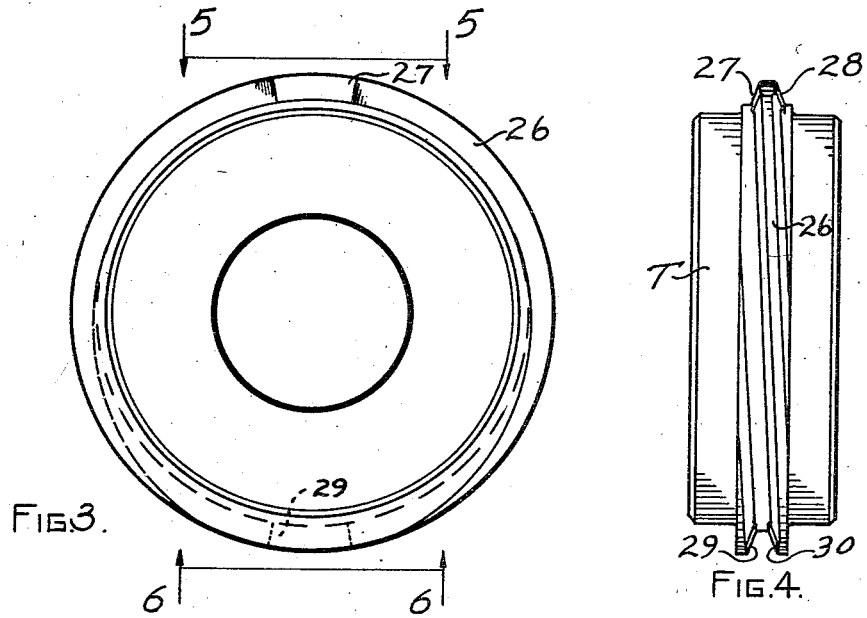
Fig.3.
Fig.4.
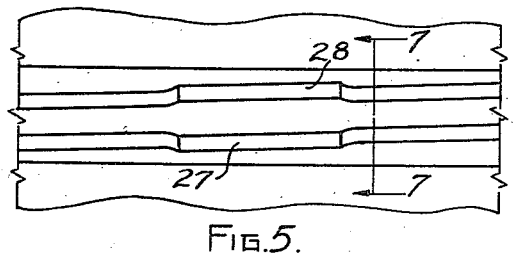
Fig.5.
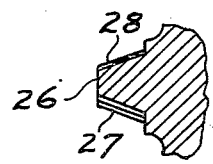
Fig.7.
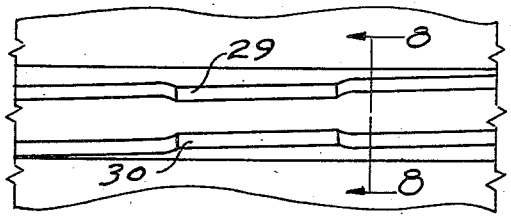
Fig.6.
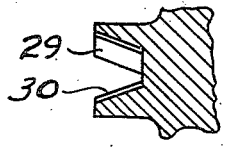
Fig.8.
*INVENTOR.*
ARTHUR I. BEAN
BY John Morton
HIS ATTORNEY

United States Patent Office 2,821,025
Patented Jan. 28, 1958

2,821,025

GEAR MEASURING INSTRUMENT

Arthur Insley Bean, Springfield, Vt., assignor to The Fellows Gear Shaper Company, Springfield, Vt., a corporation of Vermont Application August 27, 1956, Serial No. 606,294

9 Claims. (Cl. 33—179.5)

The present invention relates to gear measuring and testing equipment and in particular relates to a device for testing the thickness of the individual teeth on a gear and also the width of the individual tooth spaces in the same gear in a continuous operation. The device herein concerned may be used to measure eccentricity, circular pitch error, tooth spacing, and other elements of a work gear.

Apparatus has been used in the past to measure the composite errors in a gear but it has been difficult to analyze the individual errors in such a gear. The device of the present invention makes it possible to rapidly determine certain types of errors existing in a gear with a speed and accuracy not heretofore possible.

In the measurement of fine pitch gears it has been difficult and sometimes impossible to measure the errors in such gears because of the inability to place a stylus or measuring point in contact with the teeth of the gear in order to obtain a reading of any inaccuracies in said gear.

A principal object of the present invention is to provide a tool with separate gaging surfaces for testing the teeth of a gear and also the tooth spaces of a gear with some means between said gaging surfaces for indexing the gear to alternately measure a tooth and then a space.

Another object of the invention is to provide a means for testing the teeth and spaces on a gear which will not be affected by any eccentricity of the mounting of the measuring device on its arbor while it is being rotated.

Other objects and accomplishments of the present invention will be apparent to those skilled in the art from the following specification and accompanying drawings in which like reference characters designate the same parts wherever they appear.

In the drawings:

Figure 1 is a perspective of the present invention shown mounted in alignment with the gear to be inspected and showing a means for indicating any errors found in the gear being measured.

Figure 2 is a view showing a portion of a recording chart which may be employed in conjunction with the present invention to furnish a permanent record of any inaccuracies of the gear to be measured.

Figure 3 is an end view of the tooth space and tooth thickness measuring tool.

Figure 4 is a front view of the measuring tool of the present invention.

Figure 5 is an enlarged view showing a portion of the helical rib employed on the tool of the present invention and taken in the direction of line 5—5 of Figure 3.

Figure 6 is another enlarged partial view of the present invention taken along the line 6—6 of Figure 3.

Figure 7 is a partial section taken along the line 7—7 of Figure 5.

Figure 8 is a partial section taken along the line 8—8 of Figure 6.

In Figure 1 is shown a fixture which employs the tool of the present invention to measure the gear W. In Figure 1 a base 1 slidably supports a slide member 2 on ways 3 and 4. Means is provided on slide 2 generally denoted at 5 for locking the slide member 2 in position on the guideways 3 and 4. This locking means may be of any suitable construction well-known to the art generally employing a clamping screw acting through the gib member 6.

The base member 1 has an upright portion 7 integral therewith. Mounted on the upright portion 7 is a swivel plate 8. This swivel plate 8 is pivoted on the upright portion 7 and is locked in position after adjustment thereon through the screw member 9 and locking nut 10. The swivel plate 8 has a tail stock 11 thereon and a head stock 12. The tail stock 11 and the head stock 12 rotatably support a shaft 13 on which is mounted the measuring tool T. The shaft 13 is rotated through a hand wheel 14. As will be apparent to anyone skilled in the art mechanical means in the nature of an electric motor or other power means may be provided to rotate the shaft 13 if more rapid measuring of the work gear W is desired.

Pivotally mounted on the slide member 2 is a swinging arm 15. This arm 15 is pivoted on a screw 16 and is held on the screw 16 through a nut 17. Spring means not shown is provided to urge the arm 15 in the direction of the upright portion 7 of the base 1.

On the arm 15 is an arbor 18 on which the work gear W is mounted. The work gear W is held on the arbor 18 by a nut or other suitable locking means. On the arm 15 is an extension 19 which has formed thereon a pad 20 which pad is finished with a flat surface to contact the stem 21 of a dial indicator 22. The extension 19 also has formed thereon a stop surface indicated generally at 23. This stop surface engages a set screw 24 which is threaded in an upright portion 25 integrally formed on the slide member 2. The stop surface 23 and set screw 24 cooperate to limit the inward movement of the arm 15.

As shown in Figures 3 and 4 the tool T has a generally helical rib 26 thereon. This helical rib 26 has space gaging surfaces 27—28 and tooth gaging surfaces 29—30 formed thereon. The surfaces 27—28 are conjugate to the tooth spaces of the work gear W and the surfaces 29—30 are conjugate to the thickness of the teeth on the work gear W. These surfaces 27—28 and 29—30 are very accurately formed and if the work gear spaces and teeth are of the proper dimensions they will conform to the measurements of the gaging surfaces.

Between the gaging surfaces 27—28 and 29—30 the helical rib 26 is of a reduced dimension or thickness as clearly shown in Figure 4. The gaging surfaces 27—28 are arranged at a different radius from the axis of the tool T than are the gaging surfaces 29—30 for a purpose set forth below.

The portion of the rib 26 of reduced thickness serves as an indexing means to impart relative rotation to the tool T and work gear W so as to bring the sets of gaging surfaces into measuring relation with respect to the tooth spaces and teeth of the work gear W.

As will be obvious from the description above of Figure 1 and the disposition of the work gear W and the tool T, when the hand crank 14 is rotated rotating therewith the tool T which is mounted in meshing engagement with the work W the work gear W will be similarly rotated. When the gaging surfaces 27—28 come in contact with a tooth space on the work gear W the position of the center of the work gear relative to the center of the tool T is measured and can be compared to measurements on other tooth spaces. Any such movement will be shown on the indicator 22. When the gaging surfaces 27—28 leave the tooth space on the work gear W the helical reduced portion of the rib 26 will cause rotative movement of the work gear W until the gaging surfaces 29—30 come in contact with a tooth. The distance between the center of the work gear W and the center of the tool T is measured in a manner similar to the measurements between on the tooth space and can be compared to measurements made on other teeth.

When the work gear W is placed on the arbor 18 the slide is moved in the direction of the upright portion 7 so as to bring the work gear W into mesh with the tool T. When the work gear W is in proper mesh with the tool T the locking mechanism denoted at 5 is employed to hold the slide 2 in the desired position. This position is so located that when the gaging surfaces 29—30 are in engagement with the tooth on the work gear W that the maximum center distance between the master worm and the work being checked is reached. This will occur when the surfaces 29—30 are on the center line of a tooth of the gear. Another increased center distance between the tool T and the work being checked is reached when the space measuring surfaces of the tool T are on the center line of a space of the work gear W. This center distance is slightly less than when a tooth is on center and being measured. When the tool and work are rotated on either side of the tooth or space center lines the center distance will close slightly due to the reduced thickness of rib 26.

Both sides of the relieved portion of the helical rib may be in intimate contact with the work gear W while indexing or the stop screw 24 may be adjusted to contact surfaces 23 so that contact between rib and work gear W will be made only on the driving side of the rib.

If desired in place of the dial indicator 22 a permanent record may be obtained by using an electrical indicator and a measuring instrument similar to that shown in the patent of Stewart G. Leonard, Patent No. 2,305,265 issued December 15, 1942 and entitled "Electrical Apparatus for Indicating the Recording of Characteristics of Surfaces." If such an instrument is employed a chart similar to that shown in Figure 2 will be produced. Reference is made to this chart to explain the function and operation of the present invention.

As the tool T is rotated and the work gear W is being measured the chart obtained or the readings on the dial indicator 22 will show a series of peaks.

By employing the stop arrangement referred to any irregularities in the helical rib 26 located between the sets of gaging surfaces will not be shown on the chart.

As the peak measurements are always taken at the same position of the tool T and in exactly the same manner it will be seen that any eccentric mounting of the tool T or inaccuracies on the rib 26 will not affect the operation of the tool and the measuring operation.

The fact that the gaging or measuring surfaces 27—28 are disposed at a different radius from the axis of the tool T than are the gaging or measuring surfaces 29—30 causes the lines formed on the chart to be of different lengths as between the tooth spaces and the teeth. Obviously also if the dial indicator 22 is used rather than the charting instrument the needle on the dial indicator will move different amounts for tooth spaces than it does for teeth and the operator measuring the work gear W will be able to distinguish between the measurements of the tooth spaces than those of the teeth.

In the modern high production industry a charting instrument is customarily used so that a permanent record is obtained and the cutting of the gear can be corrected more easily. When the charts are used the perfect teeth will stop at a given line and when there is an error on the tooth thickness to the extent that it is greater than it should be the chart will show a longer line than when a perfect tooth is being measured. Similarly the charts of the spaces will end at a given line if all the teeth are perfect. However when the thickness of the space is greater than it should be the chart will show a line of less length than that obtained by the measurement of the perfect space.

An example of a typical chart is shown in Figure 2. As shown in this figure peaks $a$, $c$, $e$, $g$, and $i$ are charts of gear teeth while peaks $b$, $d$, $f$, $h$, and $j$ are charts of tooth spaces. The peaks of tooth $a$ and space $b$ are on a line indicating a perfect tooth and space. Peaks $c$, $e$, and $g$ are higher than tooth $a$ indicating thick teeth. Peaks of space $d$ and $h$ are higher than peak $b$ indicating a thin space. Peak of space $j$ is shorter than peak $b$ indicating a space wider than a correct tooth space. The dotted line in Figure 2 indicates the variation in tooth measurements while the dot and dash line indicates the variations in tooth spaces.

With the present tool and arrangement as set forth in the present specification it is possible to measure circular pitch as well as other spacing elements of the gear teeth by observing the differences between the sum of the errors of any tooth and the adjacent tooth spaces.

What I claim and desire to secure by Letters Patent is:

1. A device for measuring gears and the like consisting of a substantially cylindrical body, a plurality of gaging surfaces substantially spaced from each other peripherally about said body, said surfaces having alternately opposed measuring characteristics, said characteristics alternating between surfaces to measure teeth and surfaces to measure tooth spaces and a helical rib on the periphery of said body extending between said alternate surfaces to index said gear and to locate said gaging surfaces in the desired measuring position.

2. A device as set forth in claim 1 in which the portions of said helical rib located between said gaging surfaces are of reduced thickness relative to said surfaces.

3. A device as set forth in claim 1 in which said gaging surfaces are disposed at varying radial distances from the axis of said cylindrical body.

4. A device as set forth in claim 2 in which said gaging surfaces are disposed at varying radial distances from the axis of said cylindrical body.

5. A device for measuring gears and the like consisting of a substantially cylindrical body, a pair of gaging surfaces spaced peripherally on said body and being helically disposed with respect to each other, one of said pair of gaging surfaces being so shaped as to measure the thickness of a gear tooth, the second of said pair of gaging surfaces being so shaped as to measure the width of a gear tooth space and a helical rib disposed on the periphery of said body between said gaging surfaces, said helical rib being of reduced thickness with respect to said gaging surfaces.

6. A device as set forth in claim 5 in which said pair of gaging surfaces are disposed at different radial distances from the axis of said cylindrical body.

7. A tool for measuring gears and the like consisting of a substantially cylindrical body, a helical rib on the periphery of said body extending through substantially a single convolution about said body, said rib having formed thereon at one position a measuring portion shaped to measure the width of the teeth on the gear to be measured, a second measuring portion, said second portion being shaped to measure the width of the tooth spaces on the gear to be measured, and the portion of said rib extending between said measuring portions being of reduced thickness with respect to said measuring portions.

8. A tool of the character set forth in claim 7 in which the measuring portions are disposed at different radial distances from the axis of said cylindrical body.

9. A tool for measuring gears and the like, consisting of a substantially cylindrical body, a helical rib on the periphery of said body extending through substantially a single convolution about said body, said rib having formed thereon at one position a measuring portion having surfaces thereon adapted to measure the thickness of a given gear tooth, a second measuring portion having surfaces thereon adapted to measure the width of a given gear tooth space and the portion of said rib extending between said measuring portions having a relief formed thereon so as to recede from and provide clearance relative to the said measuring portions.

References Cited in the file of this patent

UNITED STATES PATENTS

| | | |
|---|---|---|
| 2,447,445 | Widen | Aug. 17, 1948 |
| 2,689,410 | Beam | Sept. 21, 1954 |
| 2,735,189 | Bjornberg | Feb. 21, 1956 |